United States Patent
Liu et al.

(10) Patent No.: US 11,211,615 B2
(45) Date of Patent: Dec. 28, 2021

(54) ALKALINE BATTERY HAVING A DUAL-ANODE

(71) Applicant: Energizer Brands, LLC, St. Louis, MO (US)

(72) Inventors: Zhufang Liu, Westlake, OH (US); Dawn Marie Freeman, Westlake, OH (US); Angelo Mandato, Lakewood, OH (US)

(73) Assignee: Energizer Brands, LLC, St. Louis, MO (US)

( * ) Notice: Subject to any disclaimer, the term of this patent is extended or adjusted under 35 U.S.C. 154(b) by 134 days.

(21) Appl. No.: 16/145,830

(22) Filed: Sep. 28, 2018

(65) Prior Publication Data
US 2020/0106109 A1  Apr. 2, 2020

(51) Int. Cl.
*H01M 6/06* (2006.01)
*H01M 4/06* (2006.01)
(Continued)

(52) U.S. Cl.
CPC ............. *H01M 6/06* (2013.01); *H01M 4/06* (2013.01); *H01M 6/045* (2013.01); *H01M 50/44* (2021.01)

(58) Field of Classification Search
CPC ...... H01M 6/06; H01M 6/045; H01M 2/1606; H01M 4/06; H01M 50/44
See application file for complete search history.

(56) References Cited

U.S. PATENT DOCUMENTS 5,401,590 A * 3/1995 Chalilpoyil ........... H01M 4/244
429/59
5,962,163 A * 10/1999 Urry ....................... H01M 4/06
29/623.1
(Continued)

FOREIGN PATENT DOCUMENTS

AU            438685 B2   7/1973
EP           2278645 A1   1/2011
WO     WO 2000/030193    5/2000

OTHER PUBLICATIONS

Orikasa, Y. et al., *Ionic Conduction in Lithium Ion Battery Composite Electrode Governs Cross-Sectional Reaction Distribution*, Scientific Reports 6, Article No. 2, May 19, 2016, (6 pages). DOI:10.1038/srep26382.
(Continued)

*Primary Examiner* — Jimmy Vo
(74) *Attorney, Agent, or Firm* — Alston & Bird LLP

(57) ABSTRACT

Various embodiments are directed to an electrochemical cell having a non-homogeneous anode. The electrochemical cell includes a container, a cathode forming a hollow cylinder within the container, an anode positioned within the hollow cylinder of the cathode, and a separator between the cathode and the anode. The anode comprises at least two concentric anode portions, defined by different anode characteristics. For example, the two anode portions may contain different surfactant types, which provides the two anode portions with different charge transfer resistance characteristics. By lowering the charge transfer resistance of a portion of an anode located proximate the current collector of the cell (and away from the separator) relative to an anode portion located adjacent the separator, improved cell discharge performance may be obtained.

12 Claims, 4 Drawing Sheets

(51) Int. Cl.
H01M 6/04 (2006.01)
H01M 50/44 (2021.01)

(56) References Cited

U.S. PATENT DOCUMENTS

| | | | |
|---|---|---|---|
| 7,597,824 B2 | 10/2009 | Zhu et al. | |
| 8,039,150 B2 | 10/2011 | Burchardt et al. | |
| 8,323,835 B2 | 12/2012 | Davis et al. | |
| 2007/0248879 A1* | 10/2007 | Durkot | H01M 4/52 429/130 |
| 2010/0081046 A1 | 4/2010 | Davis et al. | |
| 2018/0261851 A1 | 9/2018 | Huang | |
| 2018/0316064 A1* | 11/2018 | Wei | H01M 10/05 |

OTHER PUBLICATIONS

Mao, Z. et al., *Mathematical Modeling of a Primary Zinc/Air Battery*, Journal of the Electrochemical Society, Apr. 1, 1992, vol. 139, No. 4, pp. 1105-1114. DOI: 10.1149/1.2069348.

Horn, QC. et al., *Morphology and Spatial Distribution of ZnO Formed in Discharged Alkaline Zn/MnO2 AA Cells*, Journal of the Electrochemical Society, May 1, 2003, vol. 150, Issue 5, pp. A652-A658. DOI: 10.1149/1.1566014.

Sun, YK et al., *Nanostructured High-Energy Cathode Materials for Advanced Lithium Batteries*, Nature Materials Letters (Advance Online Publication), Oct. 7, 2012, vol. 11, (6 pages).

Newman, JS. et al., *Theoretical Analysis of Current Distribution in Porous Electrodes*, Journal of the Electrochemical Society, Dec. 1962, pp. 1183-1191, vol. 109, No. 12. DOI: 10.1149/1.2425269.

WIPO Application No. PCT/US2019/041910, International Search Report and Written Opinion of the International Searching Authority, dated Sep. 12, 2019.

Samal, Prasan K. Newkirk, Joseph W. (2015). ASM Handbook, vol. 7—Powder Metallurgy (2015)—12.2 Powder Flow. (pp. 116-117). ASM International. Retrieved from https://app.knovel.conn/hotlink/pdf/id:kt010RU151/asnn-handbook-volume-7/powder-flow (Year: 2015).

Ghavami, Robab Khayat, et al., "Performance improvements of alkaline batteries by studying the effects of different kinds of surfactant and different derivatives of benzene on electrochemical properties of electrolytic zinc", Journal of Power Sources, Nov. 22, 2006, pp. 893-899, vol. 162, Elsevier, B.V., Netherlands.

Huot, Jean-Yves, et al., "Electrochemical performance of gelled zinc alloy powders in alkaline solutions", Journal of Power Sources, Apr. 21-23, 1997, pp. 81-85, vol. 65, Elsevier Science S.A., Netherlands.

Salager, Jean-Louis, "Surfactants, Types and Uses", FIRP Booklet # E300-A, 2002, 50 pages, Version 2, Universidad De Los Andes, Venezuela.

* cited by examiner

ALKALINE BATTERY HAVING A DUAL-ANODE

BACKGROUND

Particularly for bobbin-style electrochemical cells commonly found in alkaline batteries, the positional oxidation of anode particles impacts the overall performance of the electrochemical cell. In these bobbin-style cells, a cathode (typically comprising manganese dioxide as an active material in alkaline primary cells) is formed as a generally hollow tube positioned within a cell container. An anode (typically comprising zinc or a zinc composite) is positioned within the hollow interior of the cathode and is separated from the cathode by a separator. A current collector (e.g., a nail) is positioned at the center of the anode. The entire composition is saturated in a KOH electrolyte.

As the battery discharges, the zinc particles are oxidized to form non-reactive zinc oxide particles within the anode. At a theoretical level, once the supply of zinc within the anode is exhausted by the conversion of zinc to zinc oxide, the anode is fully discharged.

Alkaline cells are highly efficient at low discharge rates and the conversion of zinc to generally more voluminous zinc oxide occurs generally uniformly across the cross section of the anode (i.e., between the separator and the current collector). However, as the discharge rate increases, the conversion of zinc to the higher-volume zinc oxide becomes increasingly biased toward the separator. Thus, zinc particles within the interior of the anode may not be fully utilized during moderate and high rate discharge, thereby preventing these zinc particles from contributing to the discharge performance of the cell. Because the anode active material is not fully exhausted, the useful life of electrochemical cell is diminished at higher drain rates, and a non-negligible portion of the anode zinc is prevented from full use during discharge.

Various attempts have been made to impede the formation of a zinc oxide barrier near the separator of alkaline electrochemical cells during moderate- and high-rate discharge, however such attempts have generally resulted in decreased low discharge rate performance. For example, surfactants have been added to coat zinc particles so as to increase a charge transfer resistance of an anode and encourage a more uniform zinc to zinc-oxide conversion. However, such surfactants generally increase the charge transfer resistance in the anode, thereby decreasing the overall performance of the electrochemical cell.

Accordingly, there is a continuing need for products and methods enabling a more efficient usage of anode active materials in electrochemical cells, particularly those providing balanced cell performance characteristics at both low- and high-discharge rates.

BRIEF SUMMARY

Various embodiments address anode discharge non-uniformity and improve efficiency of the anode in moderate- and high-discharge rate applications by varying characteristics of the anode as a function of the distance away from the cell separator. For example, providing different anode surfactant types in different portions of the anode (e.g., an interior portion near the current collector and an exterior portion near the separator), providing different anode surfactant concentrations in different portions of the anode, changing the active material concentration as a function of the distance away from the cell separator, providing different gelling agent types and/or different gelling agent concentrations in different portions of the anode, providing different electrolyte concentrations in different portions of the anode, providing different anode additives in different portions of the anode, and/or the like. By varying one or more anode characteristics as a function of the distance away from the separator (e.g., in a gradual function, a step-wise function, and/or the like) may provide different portions of the anode with different discharge resistances, thereby encouraging a particular discharge profile for the anode that increases the overall usage of anode active ingredients during cell discharge.

Various embodiments are directed to an electrochemical cell comprising: a container; a cathode forming a hollow cylinder and having a cathode outer surface adjacent an inner surface of the container and a cathode inner surface defining an interior portion of the cathode; an anode positioned within the interior portion of the cathode, wherein the anode defines an anode outer surface adjacent the cathode inner surface and a central portion; a separator disposed between the anode outer surface and the cathode inner surface; and an electrolyte; wherein the anode comprises at least two anode portions, wherein: a first anode portion located adjacent the separator and consists of a first anode formulation having a first charge transfer resistance; and a second anode portion located at the anode central portion consists of a second anode formulation having a second charge transfer resistance that is lower than the first charge transfer resistance.

According to various embodiments, the first anode formulation comprises a first surfactant and wherein the second anode formulation comprises a second surfactant, and wherein the first surfactant is different from the second surfactant. Moreover, the first surfactant may comprise a phosphate ester surfactant and the second surfactant may comprise a sulfonate surfactant. In certain embodiments, the first anode portion is separated from the second anode portion by a characteristic gradient between the first anode portion and the second anode portion. Moreover, the characteristic gradient comprises the first anode formulation and the second anode formulation, and wherein the proportion of the first anode formulation to the second anode formulation is at least substantially proportional to a radial location within the anode.

In certain embodiments, the characteristic gradient is continuous between the central portion of the anode and the anode outer surface. In various embodiments, a quantity of the first anode composition exceeds a quantity of the second anode composition within the anode.

Certain embodiments are directed to a method of forming an electrochemical cell. In various embodiments, the method comprises: forming a cathode within a container, wherein the cathode is generally cylindrical and defines a cathode outer surface positioned adjacent an interior surface of the container and a cathode interior surface defining an inner portion of the cathode; positioning a separator within the inner portion of the cathode; forming a first cylindrical anode portion adjacent the separator, wherein the first cylindrical anode portion defines an open interior and the first cylindrical anode portion consists of a first anode formulation having a first charge transfer resistance; and forming a second cylindrical anode portion within the open interior of the first cylindrical anode portion and wherein the second cylindrical anode portion consists of a second anode formulation having a second charge transfer resistance that is lower than the first charge transfer resistance.

In various embodiments, forming the first anode portion comprises extruding the first anode formulation having a first surfactant into the inner portion of the cathode; and forming the second anode portion comprises extruding the second anode formulation having a second surfactant into the open interior of the first cylindrical anode portion, wherein the second surfactant is different from the first surfactant. Moreover, the first surfactant may comprise a phosphate ester surfactant and the second surfactant may comprise a sulfonate surfactant. In certain embodiments, forming the first anode portion and forming the second anode portion collectively comprise coextruding the first anode portion and the second anode portion. Moreover, forming the first anode portion may comprise: extending a plunger into the inner portion of the cathode such that an exterior surface of the plunger is spaced apart from the separator; extruding the first anode portion between the exterior surface of the plunger and the separator; removing the plunger to form the open interior of the first anode portion; and forming the second anode portion comprises extruding the second anode portion into the open interior of the first anode portion.

In certain embodiments, a quantity of the first anode composition exceeds a quantity of the second anode composition within the anode. Moreover, forming the second cylindrical anode portion may comprise forming a mixing region between the second cylindrical anode portion and the first cylindrical anode portion.

Various embodiments are directed to an anode, for example, for use in an alkaline battery having a bobbin-style configuration. In certain embodiments, the anode comprises a first anode portion defining the anode outer surface, wherein the first anode portion consists of a first anode formulation having a first charge transfer resistance; and a second anode portion located at the anode central portion, wherein the second anode portion consists of a second anode formulation having a second charge transfer resistance that is lower than the first charge transfer resistance. In certain embodiments, the first anode formulation comprises a first surfactant and the second anode formulation comprises a second surfactant that is different from the first surfactant. Moreover, the first anode portion may be separated from the second anode portion by a characteristic gradient between the first anode portion and the second anode portion. In various embodiments, the characteristic gradient comprises the first anode formulation and the second anode formulation, and wherein the proportion of the first anode formulation to the second anode formulation is at least substantially proportional to a radial location within the anode. In certain embodiments, the characteristic gradient is continuous between the central portion of the anode and the anode outer surface. According to various embodiments, a quantity of the first anode composition exceeds a quantity of the second anode composition within the anode.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Alkaline electrochemical cells are commercially available in cell sizes commonly known as LR6 (AA), LR03 (AAA), LR14 (C) and LR20 (D). The cells have a cylindrical shape that complies with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

Figure 1:
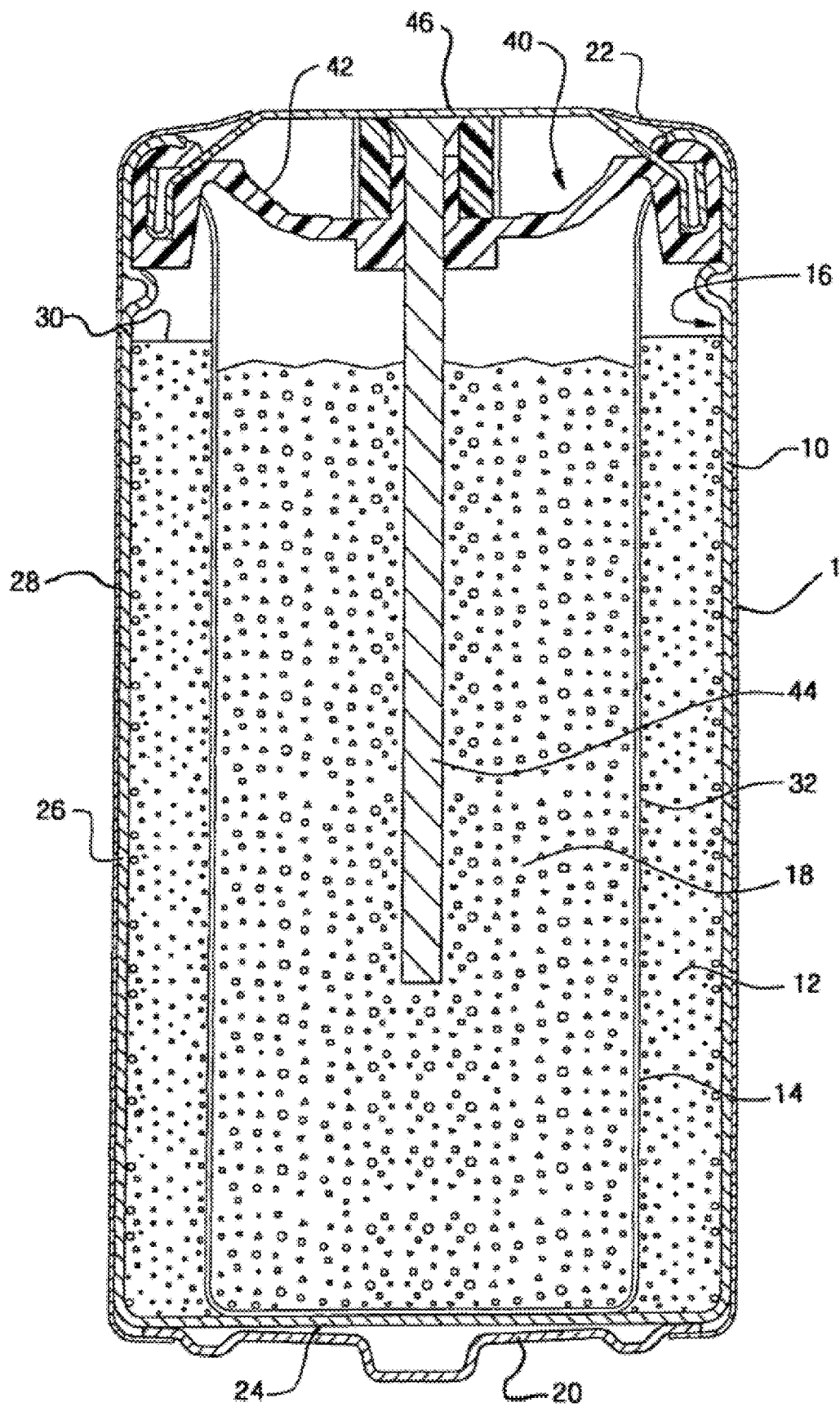
FIG. 1 is a cross-sectional elevational view of an alkaline electrochemical cell according to one embodiment.

FIG. 1 shows a cylindrical cell 1 in elevational cross-section, with the cell having a nail-type or bobbin-type construction and dimensions comparable to a conventional LR6 (AA) size alkaline cell. However, it is to be understood that cells according to various embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

The electrochemical cell 1 includes a container or can 10 having a closed bottom end 24, a top end 22, and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, which may be plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 may contain a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a hole (e.g., a centrally located hole) in closure member 42.

First electrode 18 may be a negative electrode or anode. The negative electrode includes a mixture of one or more active materials (e.g., zinc), an electrically conductive material, solid zinc oxide, and/or, in some embodiments, a surfactant. The negative electrode can optionally include other additives, for example a binder or a gelling agent, and the like.

Although the embodiment of FIG. 1 illustrates the first electrode 18 as having generally uniform characteristics, it should be understood that various embodiments comprise a non-uniform anode configuration. For example, the first electrode 18 may define a characteristic gradient between the outer surface of the first electrode 18 (e.g., proximate the separator 14) and the inner portion of the first electrode 18 (e.g., proximate the current collector 44), for example, to separate a first anode portion (consisting of a first anode formulation) from a second anode portion (consisting of a second anode formulation). The gradient may be continuous, thereby gradually changing between a first characteristic and a second characteristic (e.g., by gradually varying the relative concentrations of the anode composition having the first anode characteristic and the anode composition having the second anode characteristic) or lock-step, thereby incorporating discrete regions defined by different characteristics that may be separated by a boundary region. The boundary region may be defined by a discrete boundary between adjacent anode compositions, or by a mixing region in which portions of each of the adjacent anode compositions mix, for example, as a result of processing steps for adding multiple anode compositions into discrete regions of the cell.

In certain embodiments, the boundary between adjacent anode compositions may be centered relative to the radius of the first electrode 18 (or the boundaries may be spaced equally along the radius of the first electrode 18 in embodiments comprising more than 2 anode compositions), or the rate of change of a continuous gradient between adjacent anode compositions may be centered with the centerpoint of the radius of the first electrode 18. However, the boundary or center of the change between adjacent anode compositions may be skewed toward the separator 14 or the current collector 44 in certain embodiments. Differences in quantity between various anode compositions may be defined based on different characteristics, such as based on weight (e.g., weight percentage of the total weight of the first electrode 18), volume (e.g., a volume percentage of the total volume of the first electrode 18), thickness (e.g., a radial thickness percentage of the total thickness of the first electrode 18; in other words, a percentage of the length of the first electrode 18 radius). As an example, the weight of each anode composition (e.g., the first anode composition and the second anode composition) may be at least substantially equal. As another example, the volume of each anode composition (e.g., the first anode composition and the second anode composition) may be at least substantially equal. As yet another example, the thickness of each anode composition (e.g., the first anode composition and the second anode composition) may be at least substantially equal. It should be understood that more or less of a particular anode composition may be included within the first electrode 18 in certain embodiments (e.g., such that the weight, volume, or thickness of each anode composition is not equal). As one specific example tested in the experimental tests described below, the quantity of the first anode composition may exceed the quantity of the second anode composition, by weight.

In certain embodiments, the anode compositions associated with each of the anode characteristics may be defined by differences in surfactant type included within respective anode compositions. For example, a first anode composition may comprise a first surfactant type and a second anode composition may comprise a second surfactant type. In such embodiments, the first electrode 18 may be defined by a gradual change between the first anode composition incorporating the first surfactant proximate the separator 14 and the second anode composition incorporating the second surfactant proximate the current collector 44. As a specific example, the first anode composition incorporating the first surfactant, which is incorporated in a portion of the first electrode 18 located adjacent the separator 14 may have a higher charge transfer resistance than the second anode composition incorporating the second surfactant and located in a portion of the first electrode 18 located adjacent the current collector 44. The first anode composition incorporating the first surfactant may also have a lower anode conductivity than the second anode composition incorporating the second surfactant. In such an example, the first anode composition may comprise a phosphate ester surfactant, and the second anode composition may comprise a sulfonate surfactant (e.g., an anionic sulfonate surfactant). It is the inventors' understanding that the inclusion of the phosphate ester surfactant (e.g., a nonionic phosphate ester surfactant) in the first anode composition causes the first anode composition to have a higher charge transfer resistance and lower conductivity than the second anode composition comprising the sulfonate surfactant. By including a low charge transfer resistance portion near the current collector 44 of the first electrode 18 and a high charge transfer resistance portion near the separator 14, the first electrode 18 discharges such that the portion nearer to the current collector 44 discharges first, and in doing so causes the formation of ZnO particles within the portion of the first electrode closest to the current collector 44 prior to the formation of ZnO particles closer to the separator 14. ZnO particles formed close to the separator 14 prior to complete discharge of the portions of the anode closer to the anode's interior may prevent or at least impede complete discharge of anode active material within the anode interior by blocking the diffusion of electrolyte across the separator 14. As mentioned, formulating the first electrode (anode) such that the portion of the anode near the current collector 44 discharges prior to the portion of the anode near the separator 14 ensures that undischarged active material within the first electrode is not blocked from discharge by the formation of ZnO proximate the separator 14. After the portion of the first electrode 18 closer to the current collector 44 and having a lower charge transfer resistance at least substantially discharges, the portion of the first electrode 18 located closer to the separator 14 and having a higher charge transfer resistance begins discharging.

In embodiments in which the gradual change is defined by a lock-step change, a first, outer region of the anode (adjacent the separator 14) comprises the first anode composition incorporating the first surfactant, and a second, inner region (adjacent the current collector 44) comprises the second anode composition incorporating the second surfactant. There may be a discrete boundary between the first anode composition and the second anode composition, or there may be a small mixing region located at the boundary between the first anode composition and the second anode composition, wherein the mixing region comprises both the first surfactant and the second surfactant.

In embodiments in which the gradual change is continuous, the relative portion of the total anode composition defined by the first anode composition and the second anode composition may vary radially within the anode. For example, in a portion of the first electrode 18 immediately adjacent the separator 14, the anode composition may be defined entirely (e.g., 100%) or substantially entirely by the first anode composition comprising the first surfactant, with minimal or no traces (e.g., 0%) of the second anode composition and minimal or no traces of the second surfactant. Moving closer to the current collector 44, the percentage of the anode composition comprising the first anode composition decreases, and the percentage of the anode composition comprising the second anode composition increases, until reaching the portion of the first electrode 18 immediately adjacent the current collector 44, where the anode composition may be defined entirely (e.g., 100%) or substantially entirely by the second anode composition comprising the second surfactant, with minimal or no traces (e.g., 0%) of the first anode composition and minimal or no traces of the first surfactant.

As discussed in co-pending U.S. patent application Ser. No. 15/896,917, filed on Feb. 14, 2018, the contents of which are incorporated herein by reference in their entirety, other characteristics may vary between the first anode portion and the second anode portion. For example, the varying characteristics may be average particle size of an active material (e.g., zinc), average active material alloy composition, average concentration of an active material, average concentration of an additive, average concentration of a surfactant, and/or the like. As non-limiting examples, the relative composition of active material as a percentage of the total composition of the first electrode 18 may vary along the radius of the first electrode 18 (e.g., between the outer surface and the inner portion of the first electrode 18); one or more active material particle characteristics (e.g., particle size, surface roughness, porosity, and/or the like) may vary along the radius of the first electrode 18; the active material alloy type may vary along the radius of the first electrode, the surfactant type may vary along the radius of the first electrode, the relative composition of surfactant as a percentage of the total composition of the first electrode 18 may vary along the radius of the first electrode 18; one or more particle characteristics of one or more inactive materials may vary along the radius of the first electrode 18; and/or the like.

Figure 2:
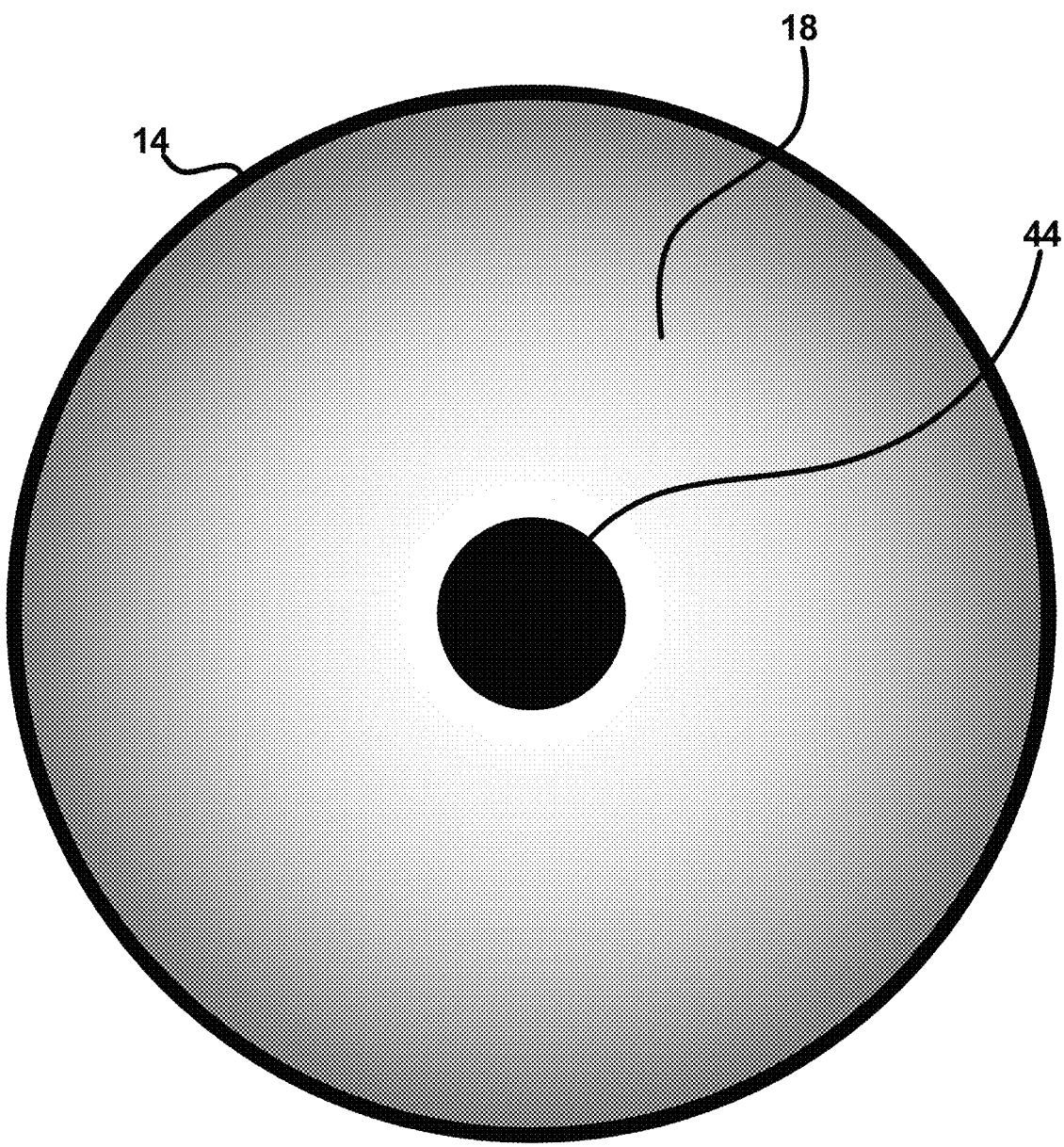
FIG. 2 is a schematic cross-sectional view of an anode according to one embodiment.

In certain embodiments, the characteristic gradient may be continuous (e.g., as illustrated in FIG. 2, which illustrates a cross-sectional schematic diagram of a first electrode 18 according to various embodiments). In such embodiments, one or more characteristics of the first electrode may change gradually, continuously, and/or the like along the radius of the first electrode 18, as illustrated based on the continuous darkening of the first electrode 18 between the current collector 44 and the separator 14 in FIG. 2. For example, in embodiments in which the average particle size of the active material changes along the radius of the first electrode, the average particle size may change continuously as a function of the radial location within the first electrode (e.g., following a linear function, an exponential function, a logarithmic function, a polynomial function, and/or the like) between the outer surface of the first electrode 18 and the inner portion of the first electrode 18. The change need not follow a particular formula, however the particle size should vary in non-discrete increments along the radius of the first electrode 18. It should be understood that similarly continuous changes between a first anode composition (e.g., having a first surfactant type) and a second anode composition (e.g., having a second surfactant type) may be provided.

In other embodiments in which other anode characteristics change along the radius of the first electrode 18, the anode characteristics may change in a manner similar to that discussed in reference to the above-described continuous change in active material particle size along the radius of the first electrode 18. In various embodiments, multiple characteristics may change along the radius of the anode to form a multiple characteristics gradient anode composition. For example, the average particle size of the active material within the anode may change along the radius of the anode and the surfactant type may also change along the radius of the anode. Any of a variety of combinations of anode characteristic changes are envisioned to provide an anode having desirable characteristics. As a specific example, an anode characteristic gradient may define a first surfactant type in a region of the anode proximate the separator and a first average active material particle size in the region of the anode proximate the separator; and a second surfactant type and a second average active material particle size in a region of the anode proximate the current collector. Such a configuration may desirably provide a lower charge transfer resistance in the region closer to the current collector 44, which may increase high-rate discharge service while minimizing gassing in the region near the current collector 44.

As discussed in greater detail herein, two or more anode compositions may be blended and extruded to form the first electrode such that the portion of the first electrode 18 located proximate the outer surface of the first electrode 18 comprises a concentration of a first anode composition that is higher than the concentration proximate the inner surface of the first electrode; the portion of the first electrode 18 located proximate the inner portion of the first electrode 18 comprises a concentration of the second anode composition that is higher than the concentration proximate the outer surface of the first electrode; and portions of the first electrode 18 between the outer surface and the inner portion continuously transition between the first composition and the second composition along the radius of the first electrode 18.

Figure 3:
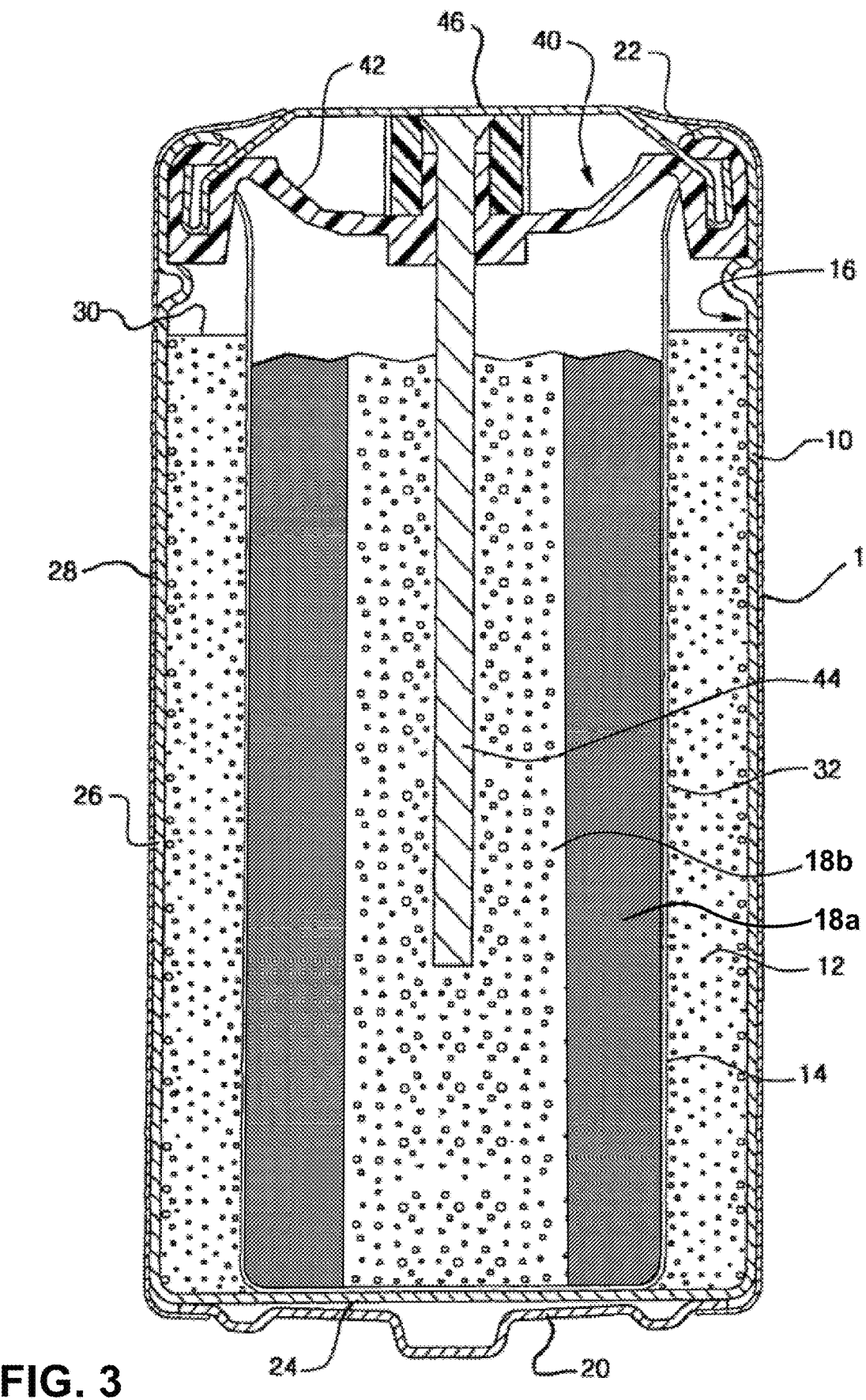
FIG. 3 is a cross-sectional elevational view of an alkaline electrochemical cell according to one embodiment.

In other embodiments, the characteristic gradient may be defined by two or more discrete regions, wherein each region has consistent material characteristics therein. The discrete regions may be formed simultaneously and/or in series. For example, as shown in FIG. 3, which is a side cross-sectional view of an electrochemical cell according to various embodiments, the first electrode 18 may comprise a first portion 18a and a second portion 18b. As shown in FIG. 3, the first portion 18a may be located between the outer surface of the first electrode 18 and the second portion 18b.

Accordingly, the second portion may be located between the first portion 18a and the inner portion of the first electrode 18 (e.g., adjacent the current collector 44). Thus, the first portion 18a may define a hollow tubular shape defining an exterior surface coexistent with the exterior surface of the first electrode 18, and an interior surface surrounding an open interior of the first portion 18a. The second portion 18b may be positioned within the interior opening of the first portion 18a, such that the second portion 18b defines an exterior surface located adjacent the interior surface of the first portion 18a, and an interior portion coexistent with the interior portion of the first electrode 18. In various embodiments, the interface between the first portion 18a and the second portion 18b (defined between the exterior surface of the second portion 18b and the interior surface of the first portion 18a) may define a discrete boundary between the first portion and the second portion. However, in certain embodiments, the interface between the first portion 18a and the second portion 18b may be defined by a mixing region defined by intermixing between the first portion 18a and the second portion 18b.

In certain embodiments, the first portion 18a may define between about 20 wt %-80 wt % of the total weight of the first electrode 18, and the second portion 18b may define between about 20 wt %-80 wt % of the total weight of the first electrode 18. In example embodiments as discussed herein, the weight of the first anode portion 18a may exceed the weight of the second anode portion 18b.

Although not shown in FIG. 3, the first electrode 18 of various embodiments may comprise more than two discrete portions. The additional portions may be located between the first portion 18a and the second portion 18b, thereby forming a series of rings (e.g., concentric rings) surrounding the second portion 18b and within the first electrode 18. As will be discussed in greater detail herein, the various discrete portions of the first electrode 18 may be coextruded into the electrochemical cell, the various discrete portions may be extruded into the electrochemical cell in series, and/or the like.

As just one example, the surfactant within the first portion 18a may be different than the surfactant within the second portion 18b. Specifically, the surfactant within the first portion 18a may cause the first portion to have a higher charge transfer resistance and lower anode conductivity than the second portion 18b. In certain embodiments, the surfactant within the first portion 18a is a phosphate ester surfactant and the surfactant within the second portion 18b is a sulfonate surfactant. As another example, a nonionic surfactant may be used in one of the first portion 18a or the second portion 18b, and an anionic surfactant may be used in the other portion of the anode. Specifically, a first surfactant having a first affinity for adhering to zinc particles may be provided in the first portion 18a and a second surfactant having a second affinity for adhering to zinc particles (e.g., a lower affinity for adhering to zinc particles) may be provided in the second portion 18b. Such a gradient of surfactant types may enable zinc plating onto the current collector 44, thereby decreasing off-gassing, while providing highly active surfactant within the region of the anode having the highest concentration of zinc oxidation during high-rate discharge.

As another example, the average particle size of the active anode material (e.g., zinc) within the first portion 18a may be larger than the average particle size of the active anode material within the second portion 18b. As another example, the average quantity of active material within the first portion 18a may be greater than the average quantity of active material within the second portion 18b (e.g., measured as a weight-percentage of the active material relative to the total weight of the respective first electrode portion; measured as a volume-percentage of the active material relative to the total weight of the respective first electrode portion; and/or the like). As yet another example, the average quantity of surfactant within the second portion 18a may be greater than the average quantity of surfactant within the second portion 18b (e.g., measured as a weight-percentage of the surfactant relative to the total weight of the respective first electrode portion; measured as a volume-percentage of the surfactant relative to the total weight of the respective first electrode portion; and/or the like).

As yet another example, the type of active material utilized in the first portion 18a may be different than the type of active material utilized in the second portion 18b (e.g., different grades of zinc may be used; zinc purchased from different suppliers may be used; zinc retrieved from different zinc mines may be used; zinc having different average porosity may be used; zinc having different surface roughness characteristics may be used; active materials having different alloy compositions may be used (e.g., different alloys may be used in different anode portions, those alloys may be selected from the non-limiting examples of zinc-bismuth alloys, zinc-indium alloys, zinc-aluminum alloys, and/or the like), and/or the like). As a specific example, a zinc alloy known to be highly reactive may be included in the first portion 18a and a zinc known to be less reactive may be included in the second portion 18b to increase high-rate service (in which zinc reactivity is generally concentrated near the separator) while decreasing off-gassing in the region proximate the current collector 44.

Zinc suitable for use in various embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 microns, and specifically 28 to 38 percent fines less than 75 microns. Generally lower percentages of fines will not allow desired high rate service to be realized and utilizing a higher percentage of fines can lead to increased gassing. A correct zinc alloy is needed in order to reduce negative electrode gassing in cells and to maintain test service results.

In certain embodiments, the amount of zinc present in the negative electrode ranges generally from about 62 to about 78 weight percent, desirably from about 64 to about 74 weight percent, and specifically about 68 to about, 72 weight percent based on the total weight of the negative electrode, i.e., zinc, solid zinc oxide, surfactant and gelled electrolyte.

The solid zinc oxide utilized in various embodiments may be highly active in order to increase high rate service such as Digital Still Camera (DSC) service, as well as to increase anode rheology and reduce DSC service variability.

The solid zinc oxide added to the anode specifically has high purity and includes low levels of impurities that can result in higher zinc gassing and lowered service. The solid zinc oxide specifically contains less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

In various embodiments, a surfactant added to one or more portions of the first electrode 18 may be either a nonionic or anionic surfactant, or a combination thereof. For example, as noted above, a nonionic surfactant may be added to one portion of the first electrode 18 and an anionic surfactant may be added to another portion of the first electrode 18. It has been found that anode viscosity is increased during discharge by the addition of solid zinc oxide alone, but is mitigated by the addition of the surfactant. The addition of the surfactant increases the surface charge density of the solid zinc oxide and lowers anode viscosity as indicated above. Accordingly, adding surfactant to a portion of the anode (e.g., a discrete portion of the anode and/or varying the concentration of the surfactant within the anode) or adding different surfactants within different portions of the anode may create a charge distribution gradient within the anode.

Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the addition of surfactant results in enhanced surface charge density of solid zinc oxide particle surface. The higher the Brunauer-Emmett-Teller (BET) surface area of solid zinc oxide, the more surfactant can be adsorbed on the solid zinc oxide surface.

Moreover, the inventors have found that differences in surfactant chemistries may create differences in the anode charge transfer resistance and anode conductivity of the anode. As specific examples, the inventors have found that an anode composition comprising a phosphate ester surfactant (e.g., nonionic phosphate ester surfactant) has a higher charge transfer resistance and lower anode conductivity than an anode composition comprising a sulfonate surfactant (e.g., anionic sulfonate surfactant). When multiple anode compositions having differences in charge transfer resistance are included within a single cell, the portion of the anode having the lower charge transfer resistance discharges first, before other portions of the anode. Thus, including a first anode composition comprising a phosphate ester surfactant (e.g., a nonionic phosphate ester surfactant) and a second anode composition comprising a sulfonate surfactant (e.g., an anionic sulfonate surfactant) within a single cell (e.g., within corresponding portions of an anode) causes the second anode composition to discharge before the first anode composition.

Given this understanding, anodes according to various embodiments comprise a plurality of anode compositions, and an anode composition located closest to the current collector 44 has a lower charge transfer resistance than an anode composition located closest to the separator 14. In such embodiments, the anode composition located closest to the current collector 44 discharges prior to the anode composition located at the separator 14, thereby preventing a premature formation of a zinc oxide barrier adjacent to the separator 14, which may impede further discharge of anode active material located closer to the current collector 44.

The aqueous alkaline electrolyte comprises an alkaline metal hydroxide such as potassium hydroxide (KOH), sodium hydroxide, or the like, or mixtures thereof. The alkaline electrolyte used to form the gelled electrolyte of the negative electrode contains the alkaline metal hydroxide in an amount from about 26 to about 36 weight percent, desirably from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent may be utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present is chosen so that lower rates of electrolyte separation are obtained and anode viscosity in yield stress are not too great which can lead to problems with anode dispensing.

Other components which may be optionally present within one or more portions of the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide may be present via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 m2/g or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

Example Method of Manufacture

As mentioned briefly herein, the one or more portions of the anode (e.g., a first portion 18a of a first electrode 18; a second portion 18b of the first electrode 18; and/or the entirety of the first electrode 18) may be extruded to form the first electrode within the electrochemical cell. In certain embodiments, various portions of the first electrode 18 may be co-extruded (e.g., by simultaneously or successively extruding separate portions of the anode via concentric nozzles), extruded in series (extruding a first portion 18a of the first electrode 18 while a die is positioned at least substantially concentrically within the can, removing the die to form an interior opening within the first portion 18a, and then extruding the second portion 18b of the first electrode 18 into the interior opening created by the removal of the die), 3D-printed (e.g., by extruding successive layers of the first electrode 18 to form the entire first electrode 18), and/or the like. In certain embodiments, a first anode composition utilized to form the first portion 18a may be extruded into the electrochemical cell, and a forming plunger may then be extended into the electrochemical cell to form the first portion 18a of the first electrode 18. For example, the forming plunger may form the first portion 18a into a general ring shape within an interior of a second electrode 12 (e.g., on an opposite side of a separator 44) to define an interior surface of the first portion 18a. Thereafter, the second portion 18b may be extruded into the interior portion of the first portion 18a, bound by the interior surface of the first portion 18a.

In one embodiment, the zinc and solid zinc oxide powders, and other optional powders other than the gelling agent, are combined and mixed. In certain embodiments, the zinc and solid zinc oxide powders may be mixed in separate batches corresponding to various portion of the anode. For example, first zinc and zinc oxide powders may be mixed to form a first batch and second zinc and zinc oxide powers may be mixed to form a second batch (e.g., comprising a zinc powder having a different average zinc particle size than the zinc powder of the first batch).

Afterwards, a surfactant may be introduced into the mixture containing the zinc and solid zinc oxide (e.g., the surfactant may be introduced into each of the various batches). A pre-gel comprising alkaline electrolyte, soluble zinc oxide and gelling agent, and optionally other liquid components, may be introduced to the surfactant, zinc and solid zinc oxide mixture(s) which are further mixed to obtain a substantially homogenous mixture (e.g., homogeneous within each batch) before addition to the cell. In various embodiments, one or more component of each batch may be varied to provide a desired anode characteristics difference between each batch (e.g., providing a different quantity of surfactant; providing a different zinc grade; providing a different zinc oxide quantity; and/or the like).

In certain embodiments, a surfactant may be introduced into the electrochemical cell prior to forming the first electrode 18 therein. For example, a surfactant may be mixed with an alkaline electrolyte (e.g., free electrolyte, as discussed herein) to be added to the electrochemical cell after the second electrode 12 is formed therein, but before the first electrode 18 is added within the electrochemical cell. In such embodiments, the surfactant may be temporarily absorbed at least in part by the second electrode 12. Once the first electrode 18 is formed within the interior portion of the second electrode (e.g., via extrusion) the surfactant may be absorbed by the first electrode 18. In such embodiments, the surfactant may be gradually absorbed by the first electrode 18, thereby creating a higher concentration of the surfactant at the exterior surface of the first electrode 18 than an inner portion of the first electrode 18 proximate the current collector 44. Accordingly, the surfactant may form an at least substantially continuous concentration gradient within the first electrode 18, which may additionally define a charge transfer resistance gradient. It should be understood that the surfactant may form a continuous concentration gradient within a first electrode 18 having a discrete first portion 18a and second portion 18b. Accordingly, the first electrode 18 may have a first characteristic gradient defined by the continuous surfactant gradient within the first electrode 18 and may simultaneously have a second characteristic gradient defined by the step-wise characteristic gradient (e.g., anode alloy composition gradient, average active material particle size gradient, average active material concentration gradient, and/or the like) defined by the first portion 18a and the second portion 18b.

In a further embodiment, the solid zinc oxide is predispersed in a negative electrode pre-gel comprising the alkaline electrolyte, gelling agent, soluble zinc oxide and other desired liquids, and blended, such as for about 15 minutes. As mentioned above, multiple batches may be provided, each comprising the solid zinc oxide, the alkaline electrolyte, gelling agent, soluble zinc oxide and other desired liquids. In certain embodiments, each batch may comprise a different composition of the combined components, as mentioned above. The solid zinc and surfactant are then added and each batch of the negative electrode composition is blended for an additional period of time, such as about 20 minutes. The amount of gelled electrolyte utilized in each batch the negative electrode composition is generally from about 25 to about 35 weight percent. For example, the amount of gelled electrolyte may be about 32 weight percent based on the total weight of each batch of negative electrode composition. Volume percent of the gelled electrolyte may, in certain embodiments, be about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. As discussed herein, the free electrolyte added prior to insertion of the negative electrode may comprise a surfactant composition that is later absorbed by the negative electrode, thereby forming a surfactant concentration gradient within the negative electrode. The remaining portion of the 29 weight percent KOH solution is injected into the separator lined cavity after the negative electrode has been inserted.

In certain embodiments, the one or more batches of negative electrode composition may be combined prior to forming the negative electrode within the electrochemical cell. For example, the one or more batches of negative electrode composition may be combined via a single-screw extrusion mixer, a dual-screw extrusion mixer, and/or the like. In various embodiments, the one or more batches of negative electrode composition may be combined to form a gradient between various portions of the negative electrode. For example, the one or more batches of negative electrode composition may be combined via a mixing component (e.g., a screw extrusion mixer) that enables at least a portion of each batch of negative electrode composition to pass along sides of the mixing component without being blended. In certain embodiments, the various batches may be blended to form a continuous gradient between portions of the negative electrode. For example, as discussed herein, the various batches may be blended and ultimately extruded or otherwise formed within the electrochemical cell such that the negative electrode defines a gradient of electrode characteristics between the formed outer surface of the negative electrode and the formed interior portion of the negative electrode.

In other embodiments, the one or more batches of negative electrode composition may be kept separate until forming the first electrode 18 within the electrochemical cell. In such embodiments, the one or more batches may be coextruded through separate nozzles to form the first electrode 18. The separate nozzles may be at least partially concentric and configured to form concentric portions of the first electrode 18. In other embodiments, a first batch (e.g., destined to form the first portion 18a of the negative electrode) may be extruded into the electrochemical cell, and a plunger, mold, or other forming component may be extended into the electrochemical cell to form the first portion 18a of the negative electrode within the electrochemical cell. After forming the first portion 18a, the second batch may be extruded into the electrochemical cell and into an interior opening that is at least substantially concentric with the first portion 18a (e.g., using the same nozzle or a different nozzle than the first batch) to form the second portion 18b. In certain embodiments, one or more additional portions (e.g., intermediate portions between the first portion 18a and the second portion 18b) may be extruded into the electrochemical cell and formed into corresponding portions prior to the formation of the second portion 18b, each of these additional portions may be formed in a manner similar to that discussed in reference to the first portion 18a.

Second electrode 12, also referred to herein as the positive electrode or cathode, may include manganese dioxide as the electrochemically active material. Manganese dioxide is present in an amount generally from about 80 to about 86 weight percent, such as from about 81 to 85 weight percent by weight based on the total weight of the positive electrode, i.e., manganese dioxide, conductive material, positive electrode electrolyte and additives such as barium sulfate. Manganese dioxide is commercially available as natural manganese dioxide (NMD), chemical manganese dioxide (CMD), or electrolytic manganese dioxide (EMD). The preferred manganese dioxide for use in a cell is EMD. Suppliers of EMD include Tronox Ltd. of Stamford, Conn.; Tosoh Corporation of Tokyo, Japan, and Erachem Comilog, Inc. of Baltimore, Md. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising manganese dioxide and then inserting the rings into the container to form the tubular-shaped second electrode. The cell shown in FIG. 1 would typically include 3 or 4 rings.

The positive electrode can include other components such as a conductive material, for example graphite, that when mixed with the manganese dioxide provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Imerys Graphite & Carbon in Bironico, Switzerland and Superior Graphite in Chicago, Ill. Conductive material is present generally in an amount from about 5 to about 10 weight percent based on the total weight of the positive electrode. Too much graphite can reduce manganese dioxide input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component, such as the manganese dioxide, conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix may be optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing. Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

The foregoing configurations address common discharge deficiencies associated with existing alkaline-cell batteries operating at high discharge rates. Through experimentation, it has been found that traditional alkaline cells do not entirely discharge when the cells are subject to high discharge rate usage. Specifically, it has been found that oxidation of zinc within the anode that causes the formation of ZnO is concentrated near the separator during high-rate discharge of alkaline cells containing generally homogeneous anodes. As mentioned above, because the ZnO has a higher particle volume than unreacted zinc, the ZnO formation near the separator effectively creates a barrier that impedes discharge of zinc particles positioned closer to the center of the anode.

Accordingly, by providing an anode characteristic gradient, the characteristics of the anode may be modified to encourage a lower discharge resistance within anode portions closer to the central current collector (and away from the separator), which may increase the quantity of zinc available near the separator after certain depth of the discharge during moderate- and high-rate discharge of the cell. For example, different surfactant types may be provided in portions of the anode proximate the separator and proximate the current collector to spread out the current distribution so that a higher percentage of the anode active materials within the anode participate in the discharge reactions; a larger average particle size of anode active material may be disposed proximate the separator (e.g., to avoid the complete consumption of the zinc near the separator during moderate and high rate discharge); and/or the like. Moreover, the portions of the anode closer to the current collector may be modified to have decreased gassing characteristics, thereby reducing undesirable gassing when the anode is highly discharged.

By providing a characteristic gradient within the anode, the overall electrical capacity of the anode may remain substantially unchanged relative to traditional, homogenous anode formulations, however the portions of the anode known to discharge more quickly in high-rate discharge applications may be modified to increase the electrical capacity of the anode in those regions. Because the overall electrical capacity of the anode remains substantially unchanged relative to homogenous anode formulations, an anode defining a characteristic gradient theoretically has similar low-rate discharge performance similar to traditional homogenous anode formulations.

Experimental Tests

The benefits of use of a dual-anode were shown in experimental tests. Specifically, experimental tests were performed to test the performance of dual-anode configurations in the Digital Still Camera (DSC) test (measuring the number of photos that may be taken on a single charge of a battery using a standard digital still camera) and 750 mA personal Grooming test (according to which cells are discharged at a rate of 750 mA for 2 minutes each hour, for a period of 8 hours per day, until the cell reaches a cutoff voltage of 1.1V). The test results are shown in FIG. 4.

In the tests, control alkaline batteries having bobbin-style constructions were constructed including a traditional, homogeneous anode configuration having at least substantially uniform characteristics throughout the entire anode volume. The control alkaline batteries included 6.3 grams of anode with 20 ppm of a phosphate ester surfactant.

Experimental alkaline batteries were also constructed having a dual-anode configuration. All other characteristics of the batteries, other than those noted below, were identical to the control alkaline batteries. The experimental alkaline batteries included a dual-anode configuration comprising a first anode portion located adjacent to a separator and a second anode portion located adjacent to a centrally located current collector. Thus, the first anode portion and the second anode portion were concentric, with the first anode portion surrounding an exterior of the second anode portion. No separator was located between the first anode portion and the second anode portion. The first anode portion (located adjacent to the separator) comprises approximately 3.6 grams of anode with 20 ppm the phosphate ester surfactant, and the second anode portion (located adjacent to the current collector) comprises approximately 2.7 grams of anode with 20 ppm of a sulfonate surfactant. The anode with the sulfonate surfactant has a lower charge transfer resistance and a higher conductivity as compared with the anode with the phosphate ester surfactant, so the anode discharge is forced to start from the inside of the anode (within the second anode portion located adjacent the current collector).

Figure 4:
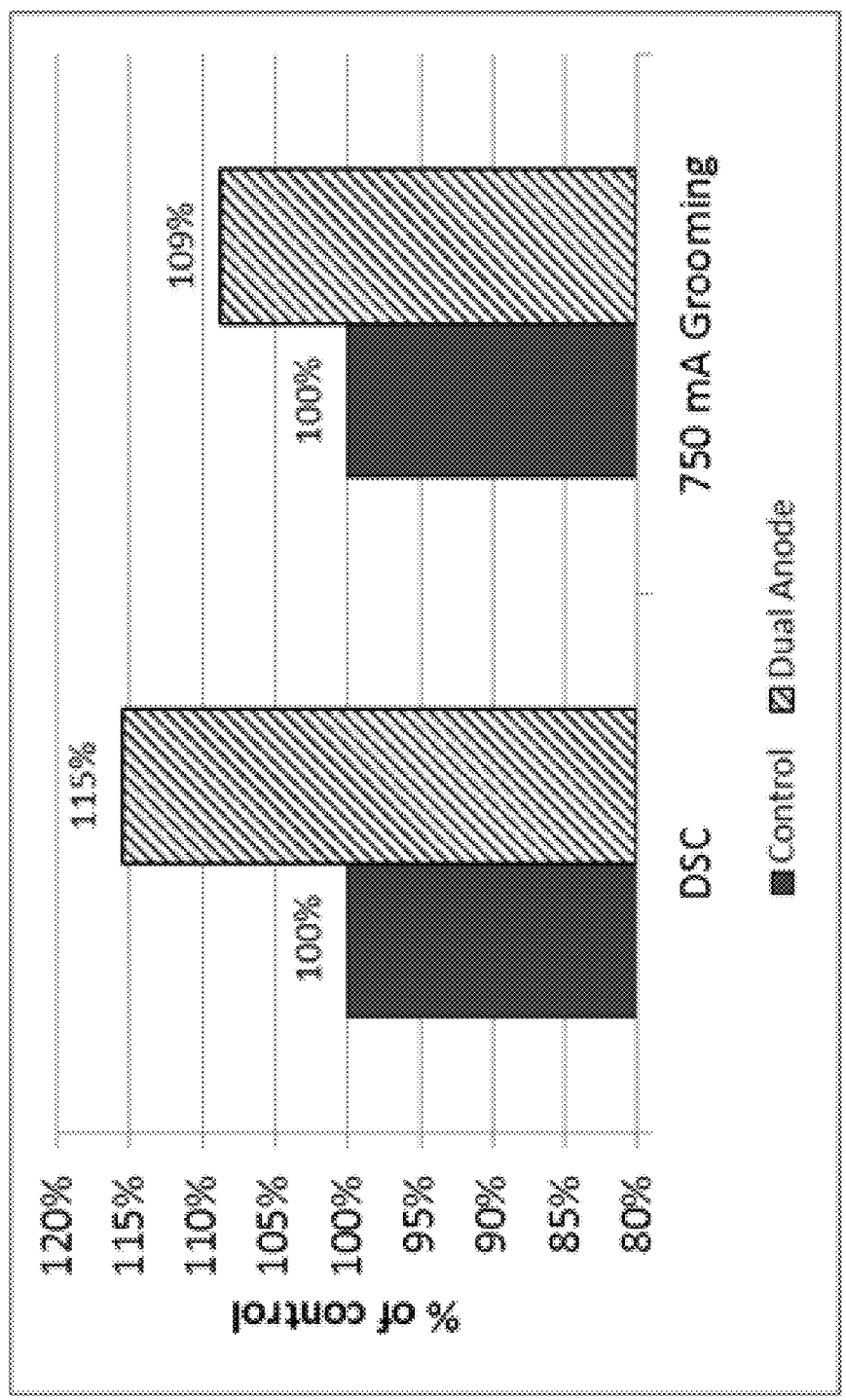
FIG. 4 is an illustration of test results from comparative tests of an alkaline battery provided according to one embodiment against a control alkaline cell.

The results shown in FIG. 4 are standardized relative to the performance of the control alkaline battery. As shown therein, the experimental dual anode alkaline battery performed 15% better than the control battery in the DSC test (i.e., the experimental alkaline battery was sufficient to complete 115% of the number of photos taken by the control battery), and the experimental dual anode alkaline battery performed 9% better than the control battery in the 750 mA personal Grooming test.

Conclusion

Many modifications and other embodiments of the inventions set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electrochemical cell comprising:
a container;
a cathode forming a hollow cylinder and having a cathode outer surface adjacent an inner surface of the container and a cathode inner surface defining an interior portion of the cathode;
an anode positioned within the interior portion of the cathode, wherein the anode defines an anode outer surface adjacent the cathode inner surface and a central portion;
a separator disposed between the anode outer surface and the cathode inner surface; and
an electrolyte;
wherein the anode comprises at least two anode portions, wherein:
a first anode portion located adjacent the separator and consists of a first anode formulation having a first charge transfer resistance;
a second anode portion located at the anode central portion and consists of a second anode formulation having a second charge transfer resistance that is lower than the first charge transfer resistance;
the first anode formulation comprises a higher concentration of a first surfactant compared to the second anode formulation and the second anode formulation comprises a higher concentration of a second surfactant compared to the first anode formulation, wherein the first surfactant is a nonionic surfactant and the second surfactant is an anionic surfactant; and
a total charge transfer resistance within the anode is at least proportional to a radial location within the anode and increases continuously for at least a portion of the anode.

2. The electrochemical cell of claim 1, wherein the first surfactant comprises a phosphate ester surfactant and the second surfactant comprises a sulfonate surfactant.

3. The electrochemical cell of claim 1, wherein the first anode portion is separated from the second anode portion by a characteristic gradient between the first anode portion and the second anode portion.

4. The electrochemical cell of claim 3, wherein the characteristic gradient comprises the first anode formulation and the second anode formulation, and wherein the proportion of the first anode formulation to the second anode formulation is at least substantially proportional to a radial location within the anode.

5. The electrochemical cell of claim 4, wherein the characteristic gradient is continuous between the central portion of the anode and the anode outer surface.

6. The electrochemical cell of claim 1, wherein a quantity of the first anode composition exceeds a quantity of the second anode composition within the anode.

7. The electrochemical cell of claim 1, wherein the first anode formulation comprises an amount of the first surfactant configured to cause the first anode portion to have the first charge transfer resistance and the second anode formulation comprises an amount of the second surfactant that is different from the amount of the first surfactant and configured to cause the second anode portion to have the second charge transfer resistance.

8. A method of forming an electrochemical cell, the method comprising:
forming a cathode within a container, wherein the cathode is generally cylindrical and defines a cathode outer surface positioned adjacent an interior surface of the container and a cathode interior surface defining an inner portion of the cathode;
positioning a separator within the inner portion of the cathode;
forming a first cylindrical anode portion adjacent the separator, wherein the first cylindrical anode portion defines an open interior and the first cylindrical anode portion consists of a first anode formulation having a first charge transfer resistance; and
forming a second cylindrical anode portion within the open interior of the first cylindrical anode portion and wherein the second cylindrical anode portion consists of a second anode formulation having a second charge transfer resistance that is lower than the first charge transfer resistance; and
wherein (i) the first anode formulation comprises a higher concentration of a first surfactant compared to the second anode formulation, (ii) the second anode formulation comprises a higher concentration of a second surfactant compared to the first anode formulation, (iii) the first surfactant is a nonionic surfactant and the second surfactant is an anionic surfactant, and (iv) a total charge transfer resistance within the anode is at least proportional to a radial location within the anode and increases continuously for at least a portion of the anode.

9. The method of claim 8, wherein forming the first anode portion comprises extruding the first anode formulation having the first surfactant into the inner portion of the cathode; and
forming the second anode portion comprises extruding the second anode formulation having the second surfactant into the open interior of the first cylindrical anode portion.

10. The method of claim 9, wherein the first surfactant comprises a phosphate ester surfactant and the second surfactant comprises a sulfonate surfactant.

11. The method of claim 8, wherein:
forming the first anode portion comprises:
extending a plunger into the inner portion of the cathode such that an exterior surface of the plunger is spaced apart from the separator;
extruding the first anode formulation between the exterior surface of the plunger and the separator to form the first anode portion;
removing the plunger to form the open interior of the first anode portion; and
forming the second anode portion comprises extruding the second anode formulation into the open interior of the first anode portion.

12. The method of claim 8, wherein forming the second cylindrical anode portion comprises forming a mixing region between the second cylindrical anode portion and the first cylindrical anode portion.

* * * * *